US012654250B2

(12) United States Patent
Ehling et al.

(10) Patent No.: US 12,654,250 B2
(45) Date of Patent: Jun. 16, 2026

(54) METHOD FOR PRODUCING A WELDED METAL BLANK AND THUS OBTAINED WELDED METAL BLANK

(71) Applicant: ArcelorMittal, Luxembourg (LU)

(72) Inventors: Wolfram Ehling, Ghent (BE); Niko Van Der Borght, Herent (BE)

(73) Assignee: ArcelorMittal, Luxembourg (LU)

( * ) Notice: Subject to any disclaimer, the term of this patent is extended or adjusted under 35 U.S.C. 154(b) by 870 days.

(21) Appl. No.: 16/978,898

(22) PCT Filed: Mar. 7, 2019

(86) PCT No.: PCT/IB2019/051856
§ 371 (c)(1),
(2) Date: Sep. 8, 2020

(87) PCT Pub. No.: WO2019/171323
PCT Pub. Date: Sep. 12, 2019

(65) Prior Publication Data
US 2021/0046577 A1    Feb. 18, 2021

(30) Foreign Application Priority Data

Mar. 8, 2018    (WO) .................. PCT/IB2018/051521

(51) Int. Cl.
*B23K 11/11*          (2006.01)
*B23K 11/00*          (2006.01)
(Continued)

(52) U.S. Cl.
CPC ........... *B23K 11/0026* (2013.01); *B23K 11/11* (2013.01); *B23K 11/163* (2013.01);
(Continued)

(58) Field of Classification Search
None
See application file for complete search history.

(56) References Cited

U.S. PATENT DOCUMENTS 11,786,993 B2 * 10/2023 Schmit .................... C22C 38/28
428/653
2004/0107757 A1    6/2004 Arns
(Continued)

FOREIGN PATENT DOCUMENTS

CN          101426612 A       5/2009
CN          104395030 A       3/2015
(Continued)

OTHER PUBLICATIONS

Search Report for PCT/IB2018/051521.
(Continued)

*Primary Examiner* — John J Norton
(74) *Attorney, Agent, or Firm* — Davidson Kappel LLC

(57) ABSTRACT

A method for producing a welded metal blank (16) includes cutting a first initial metal sheet (1) and a second initial metal sheet (3) from a first and second metal strip (4); joining the first and second initial metal sheets (1,3) by welding so as to obtain an initial welded metal blank (9), the initial welded metal blank (9) comprising a weld joint (10) joining the first and the second initial metal sheets (1,3); and cutting said initial welded metal blank (9) by a process involving metal melting so as to obtain at least one final welded metal blank (16) comprising a first metal blank portion (17) and a second metal blank portion (18) joined by a weld joint portion (19) consisting of a portion of the weld joint (10) obtained during the joining step.

20 Claims, 5 Drawing Sheets

(51) Int. Cl.

| | |
|---|---|
| *B23K 11/16* | (2006.01) |
| *B23K 15/00* | (2006.01) |
| *B23K 20/12* | (2006.01) |
| *B23K 26/322* | (2014.01) |
| *B23K 31/02* | (2006.01) |
| *B23K 101/18* | (2006.01) |
| *B23K 101/34* | (2006.01) |
| *B23K 103/04* | (2006.01) |

(52) U.S. Cl.
CPC ........ *B23K 15/0093* (2013.01); *B23K 20/122* (2013.01); *B23K 26/322* (2013.01); *B23K 31/02* (2013.01); *B23K 2101/185* (2018.08); *B23K 2101/34* (2018.08); *B23K 2103/04* (2018.08)

(56) References Cited

U.S. PATENT DOCUMENTS

| | | | |
|---|---|---|---|
| 2005/0172764 A1* | 8/2005 | Fagan ................ | B23K 37/0235 |
| | | | 83/13 |
| 2006/0259180 A1 | 11/2006 | Jahn et al. | |
| 2008/0268277 A1 | 10/2008 | Hilfrich | |
| 2009/0003952 A1* | 1/2009 | Schmauder ........ | B23K 26/0853 |
| | | | 82/124 |
| 2009/0056403 A1 | 3/2009 | Chanko | |
| 2009/0155615 A1 | 6/2009 | Chen et al. | |
| 2009/0220815 A1 | 9/2009 | Canourgues et al. | |
| 2011/0151271 A1 | 6/2011 | Keys | |
| 2013/0337285 A1* | 12/2013 | Gruber ................... | B23K 26/28 |
| | | | 428/595 |
| 2014/0003860 A1 | 1/2014 | Evangelista et al. | |
| 2015/0030382 A1* | 1/2015 | Cretteur ................. | B23K 26/60 |
| | | | 403/272 |
| 2015/0147111 A1 | 5/2015 | Teague | |
| 2017/0115656 A1* | 4/2017 | Ottnad ............... | B23K 26/1464 |
| 2017/0120391 A1 | 5/2017 | Schmit et al. | |
| 2017/0247774 A1* | 8/2017 | Sachdev ................... | C22F 1/04 |
| 2017/0266761 A1 | 9/2017 | Schmit et al. | |
| 2017/0341187 A1 | 11/2017 | Cretteur et al. | |
| 2018/0207747 A1* | 7/2018 | Bakmazjian ........... | B23K 10/00 |
| 2021/0107092 A1* | 4/2021 | Schmit ................... | B21D 37/16 |

FOREIGN PATENT DOCUMENTS

| | | | |
|---|---|---|---|
| CN | 105792979 A | 7/2016 | |
| DE | 102005022344 A1 | 11/2006 | |
| DE | 102010042561 B3 | 3/2012 | |
| EP | 1586407 A1 | 10/2005 | |
| EP | 2007545 A1 | 12/2008 | |
| JP | S53104541 A | 9/1978 | |
| JP | H09314365 A | 12/1997 | |
| JP | 2002059288 A | 2/2002 | |
| JP | 2007509797 A | 4/2007 | |
| JP | 2011527640 A | 11/2011 | |
| JP | 2017514694 A | 6/2017 | |
| KR | 20170071626 A | 6/2017 | |
| RU | 2165815 C1 | 4/2001 | |
| RU | 2240887 C1 | 11/2004 | |
| RU | 2500514 C2 | 12/2013 | |
| RU | 2569436 C2 | 11/2015 | |
| SU | 1319981 A1 | 6/1987 | |

OTHER PUBLICATIONS

Search Report for PCT/IB2019/051856.

Eren Billur, "Hot Stamping of Ultra High-Strength Steels—From a Technological and Business Perspective", ISBN 978-3-319-98868-9, 2019, Seiten vii-viii, Foreword, xi Contents, pp. 131-155, Post-Forming Operations, pp. 157-190, Tailored Properties.

M. Hyrcza-Michalska et al., Numerical simulation of car body elements pressing applying tailor welded blanks—practical verification of results, Archives of Civil and Mechanical Engineering, vol. X, No. 4, 2010.

D.A. Belforte, J.M. Jafferson, Internet-excerpt: "Laser Cutting—an overview I ScienceDirect Topics", pp. 1-15, Laser Cutting, in Reference Module in Materials Science and Materials Engineering, 2016; D.A. Belforte, in Encyclopedia of Materials: Science and Technology, 2011.

Internet-Excerpt: "CNC cutting systems for large-scale applications", pp. 1-8, Microstep, 2017.

* cited by examiner

METHOD FOR PRODUCING A WELDED METAL BLANK AND THUS OBTAINED WELDED METAL BLANK

The present disclosure relates to a method for producing a welded metal blank, to a method for producing a press-formed welded metal part, as well as to the thus obtained welded metal blank and press-formed welded metal part.

BACKGROUND

Over the past years, in order to provide a good compromise between vehicle weight and mechanical resistance, structural elements for automotive vehicles have been increasingly produced from so-called tailored blanks.

Tailored blanks are generally obtained by joining metal sheets having different properties, and for example different thicknesses, strengths or ductilities, into a single welded blank prior to subsequent forming operations to a desired shape. It is thus possible to obtain optimum material properties precisely where needed within the formed part for each considered application. For example, thicker and/or stronger sheet material is typically used at locations that previously required reinforcement parts.

Generally, in order to produce a three-dimensional part using such welded blanks, at least two metal sheets having different properties are cut from a respective metal strip and these two sheets are then joined through welding, for example using laser welding, so as to form a tailored blank. A forming process is then applied to the thus obtained welded blank so as to produce a three-dimensional part. Depending on the desired mechanical properties of the part, this forming process may be a cold forming or a hot forming process carried out in an adapted forming press. After forming, the edges of the part are trimmed so as to obtain a final part having the desired dimensions.

This method is not entirely satisfactory. Indeed, in order to be able to produce, for example through press-forming, a part having the desired properties in precisely the right place, high tolerances are required for the dimensions of the welded blanks. Such high tolerances are detrimental since they result in a high amount of scrap, and therefore of wasted material.

Furthermore, due to the relatively high dimensional tolerances on the welded blanks, it is usually necessary to perform a trimming operation on the final three-dimensional part to remove a relatively high amount of excess material resulting from the dimensional tolerances on the welded blank. Such a cutting operation is complicated and expensive to carry out due to the three-dimensional shape of the part.

SUMMARY

An object of the present disclosure is therefore to provide a method which allows producing a press-formed welded steel part in a more cost-effective manner.

For this purpose, the present disclosure provides a method for producing a welded metal blank, comprising the steps of:

cutting at least a first initial metal sheet from a first metal strip and a second initial metal sheet from a second metal strip;

joining at least the first and the second initial metal sheet by welding so as to obtain an initial welded metal blank having an initial contour, the initial welded metal blank comprising a weld joint joining the first and the second initial metal sheets; and cutting said initial welded metal blank by a process involving metal melting so as to obtain at least one final welded metal blank having a final contour, the final welded metal blank comprising a first metal blank portion and a second metal blank portion joined by a weld joint portion consisting of a portion of the weld joint obtained during the joining step.

The method may further comprise one or more of the following features, taken alone or according to any technically possible combination:

the first and/or the second initial metal sheet has a quadrilateral-shaped contour, and in particular a contour chosen among a rectangular, a parallelogram-shaped or a trapezoid contour;

the joining step is a laser welding, an electron beam welding, an arc welding, a friction stir welding or a resistance welding step, and preferably a laser welding step;

the weld joint obtained during the joining step has a length greater than or equal to 300 mm, and preferably greater than or equal to 600 mm;

the final contour of the final welded metal blank includes at least one non-linear portion, and in particular at least one curvilinear portion.

during the cutting step carried out on the initial welded metal blank, at least two final welded metal blanks are cut from the initial welded metal blank;

each final welded metal blank has a final contour delimiting a respective area, and the sum of the areas delimited by the final contours of all the final welded metal blanks cut from a considered initial welded metal blank is strictly smaller than the area delimited by the initial contour of the respective initial welded metal blank;

for at least one final welded metal blank, the weld joint portion has a length smaller than or equal to 250 mm;

a ratio between the length of the weld joint portion and a dimension of the final welded metal blank taken perpendicular to the weld joint portion is smaller than or equal to 1;

the first and the second metal strip have different properties;

the first and the second initial metal sheet comprise a steel substrate;

the first and/or the second initial metal sheet comprises, on at least one of the main faces of the substrate, a precoating comprising an intermetallic alloy layer and a metallic alloy layer extending atop the intermetallic alloy layer, the metallic alloy layer being a layer of aluminum, a layer of aluminum alloy or a layer of aluminum-based alloy;

the method further comprises, for at least one among the first initial metal sheet and the second initial metal sheet, a step of removing the precoating over at least a fraction of its thickness at a weld edge on at least one face of the first and/or second initial metal sheet prior to joining the first and second initial metal sheets through welding;

the final welded metal blank has a thickness comprised between 0.8 mm and 5 mm and comprises a peripheral edge surface resulting from the cutting operation, the peripheral edge surface extending from one main face of the final welded metal blank to the other, and wherein the cutting step carried out on the initial welded metal blank is a laser cutting step, the laser cutting being carried out in such a way that it results directly in a surface fraction of aluminum on a substrate region of the peripheral edge surface directly resulting from the laser cutting operation greater than or equal to 9% and a surface fraction of aluminum on the bottom half of the substrate region of the peripheral edge surface directly resulting from the laser cutting operation is greater than or equal to 0.5%;

the welding, and in particular the laser welding, is performed using a filler material;

the cutting step carried out on the first and/or second metal strip so as to obtain the first and second initial metal sheets is a mechanical cutting step, and in particular a shearing step;

the cutting step carried out on the initial welded metal blank is a plasma cutting, a laser cutting or a flame cutting step, and preferably a laser cutting step; and the cutting step on the initial welded metal blank is performed so as to obtain a final welded blank which does not include any weld start or stop craters or defects.

The present disclosure also provides a method for producing a press-formed welded metal part comprising the steps of:

producing a final welded metal blank using the method as described above;

press-forming said final welded metal blank into a three-dimensional shape so as to obtain a press-formed welded metal part, and optionally trimming the edges of said welded metal part using 3D laser cutting so as to obtain a final press-formed welded metal part, wherein the 3D laser cutting removes material from the press-formed welded metal part over a width smaller than or equal to 10 mm.

The method may further comprise one or more of the following features, taken alone or according to any technically possible combination:

the press-forming step is a hot forming step carried out in a hot forming press;

the first and second metal blank portions of the final welded metal blank comprise a steel substrate, and the method further comprises a step of cooling the press-formed welded metal part so as to obtain a press-hardened press-formed welded metal part, the cooling rate being preferably equal to or greater than the critical martensitic or bainitic cooling rate of at least one of the substrates of the final welded metal blank; and the press-forming step is a cold forming step.

The present disclosure further provides a welded metal blank comprising a first metal blank portion and a second metal blank portion joined by a weld joint, the welded metal blank comprising a peripheral edge surface extending from one main face of the welded metal blank to the other over the entire contour of the welded metal blank, the peripheral edge surface comprising solidification striations extending over the entire contour of the welded metal blank and over at least a fraction of the height of the peripheral edge surface.

The welded metal blank may further comprise one or more of the following features, taken alone or according to any technically possible combination:

the contour of the welded metal blank includes at least one non-linear portion, and in particular at least one curvilinear portion;

the weld joint has a length smaller than or equal to 250 mm;

the first and second metal blank portions comprise a steel substrate;

each of the first and second metal blank portions comprises a steel substrate carrying, on at least one of its faces, a precoating including an intermetallic alloy layer and a metallic alloy layer extending atop the intermetallic alloy layer, the metallic alloy layer being a layer of aluminum, a layer of aluminum alloy or a layer of aluminum-based alloy;

a thickness of the welded metal blank is comprised between 0.8 mm and 5 mm and the surface fraction of aluminum on a substrate region of the peripheral edge surface is greater than or equal to 9% and the surface fraction of aluminum on the bottom half of the substrate region of the peripheral edge surface is greater than or equal to 0.5%; and the weld joint does not include any weld start or stop craters or defects.

The present disclosure further provides a press-formed welded metal part comprising a first metal part portion and a second metal part portion joined by a weld joint, the press-formed welded metal part comprising a peripheral edge surface extending over the entire contour of the welded metal part, the peripheral edge surface comprising solidification striations extending over the entire contour of the welded metal part and over at least a fraction of the height of the peripheral edge surface.

The press-formed welded metal part may further comprise one or more of the following features, taken alone or according to any technically possible combination:

the first metal part portion and the second metal part portion comprise a steel substrate;

the press-formed welded metal part is a hot press-formed metal part, the substrate of the first and/or the second metal part portions having a mainly bainitic and/or martensitic microstructure; and the press-formed welded metal part is a cold press-formed metal part.

The present disclosure further provides an installation for producing a welded metal blank, comprising:

a first cutting station, configured for cutting at least a first initial metal sheet from a first metal strip and a second initial metal sheet from a second metal strip;

a welding station, configured for joining at least the first and the second initial metal sheet by welding so as to obtain an initial welded metal blank having an initial contour, the initial welded metal blank comprising a weld joining the first and the second initial metal sheets; and a second cutting station, configured for cutting said initial welded metal blank using a cutting process involving metal melting so as to obtain at least one final welded metal blank having a final contour, the final welded metal blank comprising a first metal blank portion and a second metal blank portion joined by a weld joint portion consisting of a portion of the weld joint obtained during the joining step.

The present disclosure further provides an installation for producing a press-formed welded metal part comprising:

an installation for producing a welded metal blank as described above;

a press configured for press-forming said welded metal blank into a three-dimensional shape so as to obtain a press-formed welded metal part, and optionally, a 3D laser cutting station, configured for trimming the edges of said welded metal part using 3D laser cutting so as to obtain a final press-formed welded metal part.

BRIEF DESCRIPTION OF THE DRAWINGS

The present disclosure will be better understood upon reading the following specification, given only by way of example and with reference to the appended drawings, in which.

DETAILED DESCRIPTION

Figure 1:
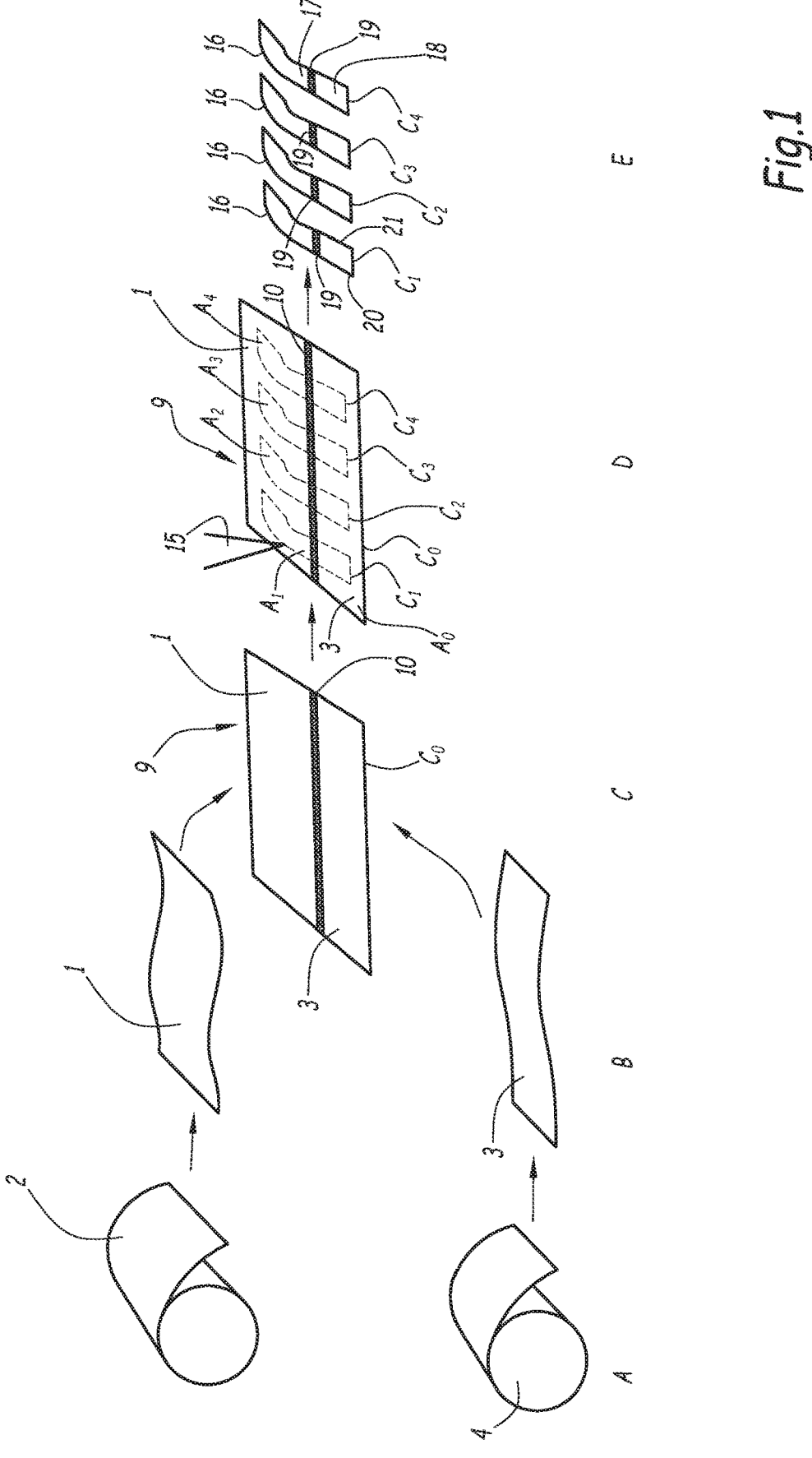
FIG. 1 is a schematic view of a method for producing a welded metal blank according to the present disclosure.

FIG. 1 schematically illustrates the different steps of a method for producing a welded metal blank according to one embodiment of the present disclosure.

This method comprises a step of cutting at least a first initial metal sheet 1 from a first metal strip 2 and a second initial metal sheet 3 from a second metal strip 4 (see FIG. 1, A and B).

The first and second metal strips 2, 4 may be initially provided in an uncoiled or in a coiled state.

Figure 2:
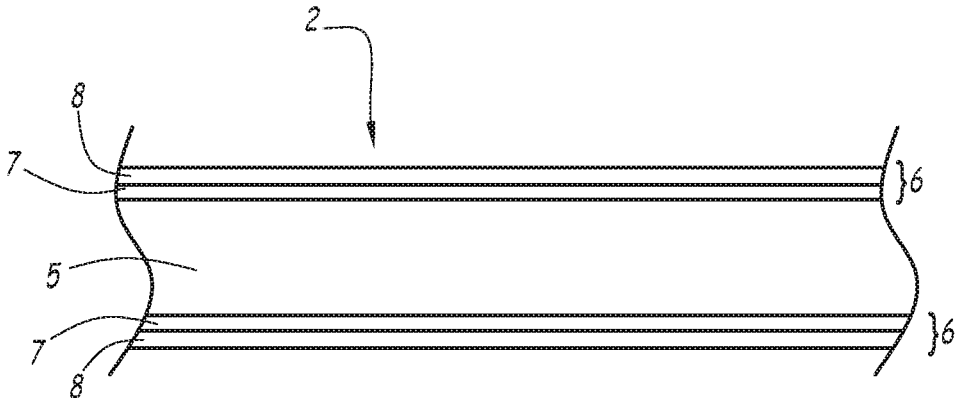
FIG. 2 is a schematic side view of a metal strip used in a first embodiment of the present disclosure.

As shown in FIG. 2, in the first embodiment, the first and the second metal strip 2, 4 each comprise a steel substrate 5 carrying a precoating 6 on at least one of its faces, and preferably on both of its faces.

The steel of the substrate 5 is more particularly a steel having a ferrito-perlitic microstructure.

Preferably, the substrate 5 is made of a steel intended for thermal treatment, more particularly a press-hardenable steel, and for example a manganese-boron steel, such as a 22MnB5 type steel.

In this embodiment, the precoating 6 comprises at least an intermetallic alloy layer 7 in contact with the substrate 5 and a metallic alloy layer 8 extending atop the intermetallic alloy layer 7. The metallic alloy layer 8 is more particularly a layer of aluminum, a layer of aluminum alloy or a layer of aluminum-based alloy. In this context, an aluminum alloy refers to an alloy comprising more than 50% by weight of aluminum. An aluminum-based alloy is an alloy in which aluminum is the main element, by weight.

For example, the metallic alloy layer 8 is a layer of aluminum alloy further comprising silicon. More particularly, the metallic alloy layer 8 comprises, by weight:

8%≤Si≤11%,
2%≤Fe≤4%, the rest being aluminum and possible impurities.

The precoating 6 may in particular be obtained by hot-dip coating, i.e. by immersion of the substrate 5 into a bath of molten metal.

The particular structure of the precoating 6 comprising the intermetallic alloy layer 7 and the metallic alloy layer 8 obtained by hot-dip coating is in particular disclosed in patent EP 2 007 545.

The first and second metal strips 2, 4 preferably have different properties. In particular, the first and the second metal strip 2, 4 may have different compositions, thicknesses, widths, mechanical properties and/or coatings. Different mechanical properties may for example include different tensile strengths, yield strengths and/or ductilities.

The first and/or the second metal strip 2, 4 for example have a thickness comprised between 0.8 mm and 10 mm, and more particularly comprised between 0.8 mm and 5 mm, even more particularly between 0.8 mm and 2.5 mm.

The first and second initial metal sheets 1, 3 are cut from the first and second metal strips 2, 4 in an uncoiled state.

Preferably, the first and the second initial metal sheet 1, 3 each have a contour comprising only rectilinear edges.

The contours of the first and second initial metal sheets 1, 3 preferably have a quadrilateral shape, and are advantageously chosen among a rectangular, a parallelogram-shaped and a trapezoid contour.

The step of cutting the first and the second initial metal sheet 1, 3 respectively from the first and the second metal strip 2, 4 is carried out through mechanical cutting or through a process involving metal melting, such as laser cutting, flame cutting or plasma cutting.

In the case of laser cutting, the cutting step may be carried out using a $CO_2$ laser or a solid state laser, such as an Nd:YAG (neodymium-doped yttrium aluminium garnet) laser, a diode laser, a fiber laser or a disk laser or any other type of laser suitable for laser cutting.

In the case where a $CO_2$ laser is used, the power of the laser is for example comprised between 2 kW and 7 kW.

In the case where a solid state laser is used, the power of the laser is for example comprised between 1 kW and 8 kW.

The laser is advantageously a continuous wave laser.

The laser cutting is further advantageously carried out using an inert gas as an assist gas for the laser cutting, and in particular nitrogen, argon or helium or mixtures thereof. According to an alternative, an active gas is used as an assist gas, and for example oxygen.

In the case where mechanical cutting is used, the cutting operation is for example carried out using a shearing tool or a cutting die.

Mechanical cutting is preferred, since it results in lower cutting costs than laser cutting. Indeed, considering the very simple shapes of the first and second initial metal sheets 1, 3, it is not necessary to use a specially manufactured die for performing the cutting operation. In particular, a conventional shearing tool may be used. In the case where a die is used for performing the cutting, since the shapes of the initial metal sheets 1, 3 are unspecific, the same die may be reutilized for producing different final welded metal blanks.

According to one embodiment, one dimension of the first and/or of the second initial metal sheet 1, 3 is identical to the width of, respectively the first or the second metal strip 2, 4. In this case, two of the edges of the first and/or the second initial metal sheets 1, 3 coincide with the edges of the respective metal strip 2, 4. According to an alternative, all of the edges of the first and/or the second metal strip 2, 4 are obtained by cutting from the first, respectively second, metal strip 2, 4.

For example, one edge, and for example the longest edge, of the first and/or second initial metal sheet 1, 3 has a length greater than or equal to 300 mm, preferably greater than or equal to 500 mm, even more preferably than or equal to 600 mm, and even more preferably greater than or equal to 1000 mm.

According to one example, the first and second metal sheets 1, 2 have different surface areas.

As shown in FIG. 1C, the first and the second initial metal sheet 1, 3 are then joined by welding so as to obtain an initial welded metal blank 9 having an initial contour $C_0$.

The welding may be carried out through laser welding, electron beam welding, arc welding, friction stir welding or resistance welding.

The joining step is preferably a step of joining by butt welding. The initial metal sheets 1, 3 may for example be welded along their longest edges or along their shortest edges depending on the needs.

According to one example, the welding is an autogenous welding, i.e. a welding carried out without the addition of a filler material. According to an alternative, the welding, and for example the laser welding, is carried out using a filler material, and for example a filler wire.

As can be seen in FIG. 1C, the thus obtained initial welded metal blank 9 comprises the first and second initial metal sheets 1, 3 and a weld joint 10 joining the first and the second initial metal sheets 1, 3.

The initial welded metal blank 16 is substantially flat.

The weld joint 10 is preferably substantially rectilinear.

According to one example, the weld joint 10 has a length greater than or equal to 300 mm, preferably greater than or equal to 500 mm, even more preferably than or equal to 600 mm, and even more preferably greater than or equal to 1000 mm.

The method further comprises a step of cutting said initial welded metal blank 9 using a process involving metal melting so as to obtain at least one final welded metal blank 16 (see FIG. 1D).

The cutting process involving metal melting is for example laser cutting, plasma cutting or flame cutting. It is carried out using an adapted cutting tool, for example a laser beam, a plasma torch or a heat source adapted for flame cutting associated with an oxidizing gas source.

In the example shown in FIG. 1, the step of cutting said initial welded metal blank 9 so as to obtain the final welded metal blank 16 is a laser cutting step, using a laser beam 15.

The laser types and assist gases that may be used for this step are the same as mentioned previously for the initial cutting step in view of obtaining the initial metal sheets 1, 3.

For a given laser beam, the laser cutting speed may be chosen in particular depending on the thicknesses of the first and second initial metal sheets 1, 3.

According to one embodiment, a constant cutting speed is used over the entire contour $C_1$, $C_2$, . . . of the final welded metal blank 16. According to an alternative, the cutting speed varies between the first and the second initial metal sheet 1, 3, in particular if these sheets 1, 3 have different thicknesses.

Preferably, the cutting step comprises a step of positioning the cutting tool, and for example the laser beam 15, relative to the initial welded metal blank 9.

This positioning is preferably carried out using the weld joint 10 as a reference. Indeed, in this case, the positioning is independent from the possible dimensional tolerances of the initial welded metal blank 9. For this purpose, the position of the weld joint 10 may be detected through any adapted optical means or, alternatively, mechanically, by detecting the transition between the two initial metal sheets 1, 3, for example at one edge of the initial welded metal blank 9.

According to an alternative, the positioning is carried out using an edge of the initial welded metal blank 9 as a reference. This positioning method may for example be used in cases where there are only small tolerances on the dimensions of the initial welded metal blank 9.

As can be seen in FIG. 1D and E, each final welded metal blank 16 comprises a first metal blank portion 17 and a second metal blank portion 18 joined by a weld joint 19.

Figure 3:
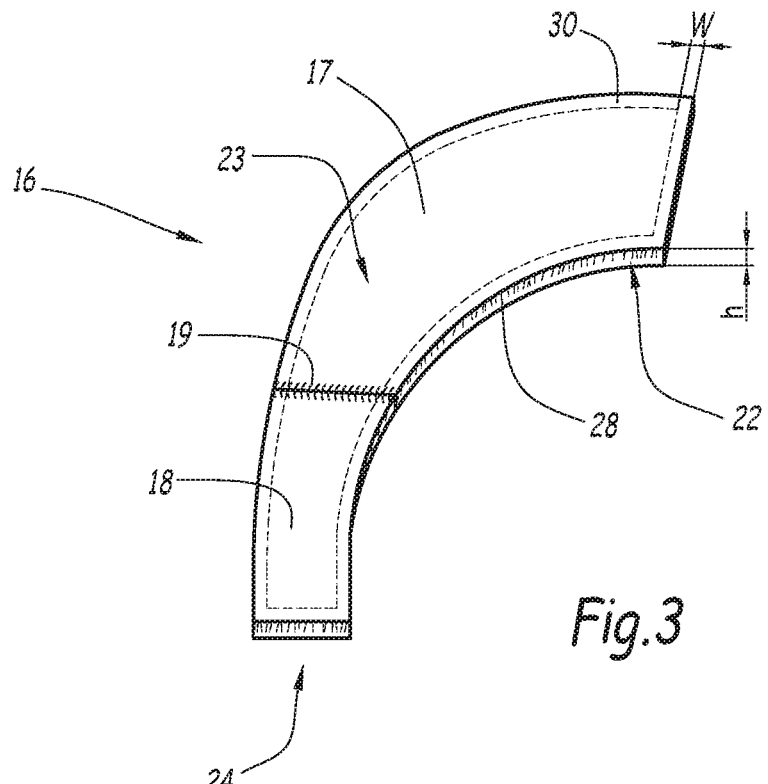
FIG. 3 is a schematic perspective view of a welded metal blank according to one embodiment of the present disclosure.
Figure 4:
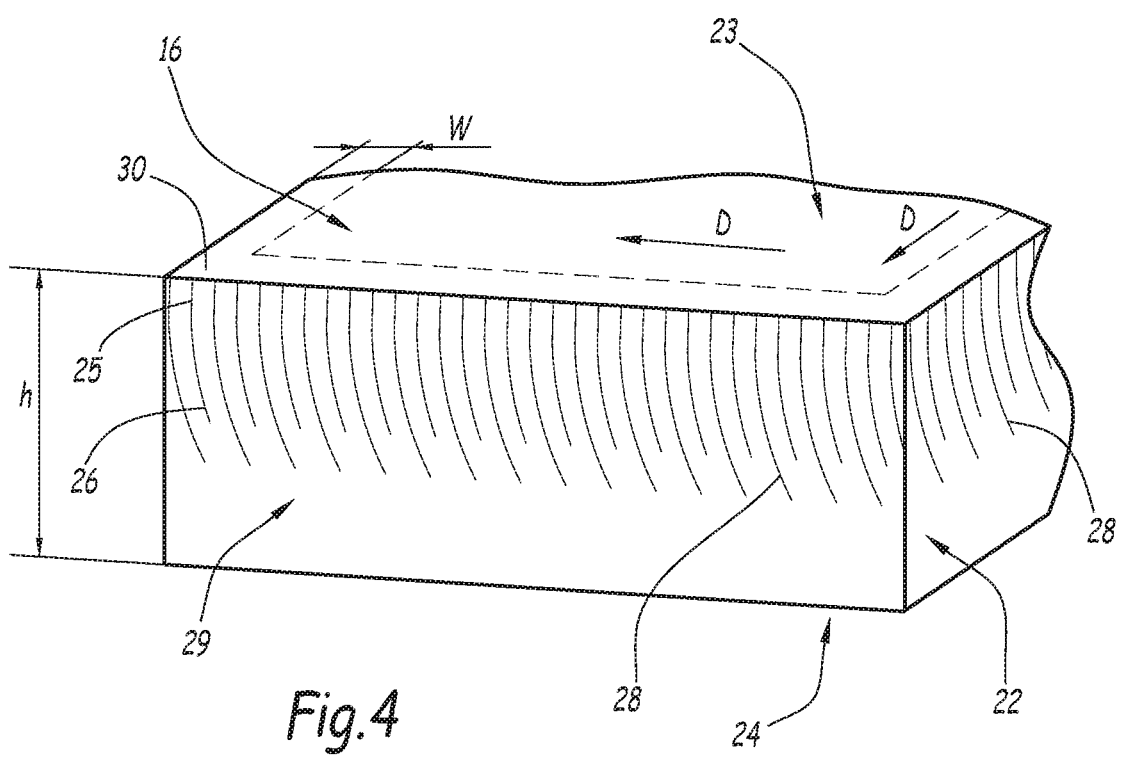
FIG. 4 is a schematic perspective view of a portion of the welded metal blank of FIG. 3.

As shown in FIGS. 3 and 4, each final welded metal blank 16 further comprises two main faces 23, 24 and a peripheral edge surface 22 extending along the entire contour $C_1$, $C_2$, . . . of the final welded metal blank 16, from one face 23 of the final welded metal blank 16 to the other 24. The peripheral edge surface 22 is a cut surface resulting from the cutting operation, and in particular a laser cut surface in the case where laser cutting is used.

The main faces 23, 24 extend substantially parallel to one another.

The peripheral edge surface 22 for example extends at an angle comprised between 65° and 90° relative to at least one of the main faces 23, 24, and advantageously at an angle of about 90° relative to the main faces 23, 24.

More particularly, the first metal blank portion 17 is a portion of the first initial metal sheet 1 and the second metal blank portion 18 is a portion of the second initial metal sheet 3. Therefore, the first and second metal blank portions 17, 18 have the compositions, mechanical properties and thicknesses of the respective initial metal sheets 1, 3. In particular, the first and second metal blank portions 17, 18 each comprise a substrate having the composition of the respective initial metal sheet 1, 3 and, possibly, a precoating having the composition and structure of the precoating 6 of the respective initial metal sheet 1, 3.

The weld joint 19 consists of a portion of the weld joint 10 obtained during the joining step.

The weld joint 19 preferably has a length smaller than or equal to 250 mm, and more particularly smaller than or equal to 150 mm, and even more particularly smaller than or equal to 100 mm.

In the example shown in FIG. 1, the weld joint 19 extends from one edge 20 of the final welded metal blank 16 to an opposite edge 21 thereof.

Advantageously, for a given final welded metal blank 16, the ratio between the length of the weld joint 19 and the largest dimension of the final welded metal blank 16 taken perpendicular to the direction of the weld joint 19 is smaller than or equal to 1, and more particularly smaller than or equal to 0.7. Such a geometry is advantageous from the point of view of productivity, as it results in an increased number of final welded metal blanks 16 that may be cut out from the initial welded metal blank 9.

Each final welded metal blank 16 is substantially flat.

Each final welded metal blank 16 has a final contour $C_1$, $C_2$, etc delimiting a respective area $A_1$, $A_2$, etc.

Preferably, the final contour $C_1$, $C_2$, . . . has a shape which is not homothetic of the shape of the initial contour $C_0$. It is preferably not rectangular, trapezoid or parallelogram-shaped, and for example not in the shape of a quadrilateral.

Preferably, the contour $C_1$, $C_2$, . . . of each of the final welded metal blanks 16 comprises a non-linear portion, and for example a curvilinear portion.

The number of final welded metal blanks 16 cut out from the initial welded metal blank 9 depends on the geometry of the final welded metal blanks 16, as well as on the dimensions of the initial welded metal blank 9. Advantageously, during the cutting step, at least two final welded metal blanks 16 are cut from the initial welded metal blank 9, and for example between three and ten final welded metal blanks 16. Preferably, nesting is carried out so as to maximize the number of final welded metal blanks 16 that may be cut out of the initial welded metal blank 9 during the cutting step.

In the example shown in FIG. 1, the sum of the areas $A_1$, $A_2$ delimited by the final contours $C_1$, $C_2$, . . . of all the final welded metal blanks 16 cut out from a considered initial welded metal blank 9 is strictly smaller than the area delimited by the initial contour $C_0$ of the respective initial welded metal blank 9. In other words, the cutting operation produces a non-zero amount of scrap material.

Preferably, the contours $C_1$, $C_2$, . . . of all the final welded metal blanks 16 obtained from a given initial welded metal blank 9 have substantially the same shape.

According to an alternative, at least two final welded metal blanks 16 have differently shaped contours $C_1$, $C_2$, etc. Such an alternative offers the advantage that it allows to produce different types of final welded blanks 16 having the same thickness and composition combination in one batch. Different volumes per type of final welded blank 16 can be managed by adapting the occurrence frequency of each type of final welded blank 16 over the initial welded blank 9.

The final welded metal blank 16 has specific features resulting from the use of a cutting method involving metal melting for obtaining the final welded metal blank 16.

In particular, the use of such a cutting method results in a fusion of the material at the cut edge, which then resolidifies forming solidification striations, also called solidification ripples. The spacing and inclination of these solidification striations depends, in particular, on the cutting speed, on the thickness of the final welded metal blank 16 and, in case an assist gas is used, on the nature and the pressure of the assist gas used for the cutting. Therefore, as shown in FIGS. 3 and 4, the peripheral edge surface 22 of the final welded metal blank 16 comprises a plurality of solidification striations or ripples 28.

The example shown in FIGS. 3 and 4 relates more specifically to a peripheral edge surface 22 obtained through laser cutting. However, analogous striations 28 are obtained with any other type of cutting method involving metal melting.

Due to the fact that the entire contour $C_1$, $C_2$, . . . has been cut out from the initial welded metal blank 9, the solidification striations 28 extend on the peripheral edge surface 22 over the entire contour $C_1$, $C_2$, . . . of the welded metal blank 16, including on the surface of the weld joint 19.

As can be seen more particularly in FIG. 4, the solidification striations 28 extend from one main face 23 of the final welded metal blank 16 over at least a fraction of the height h of the peripheral edge surface 22.

The height h of the peripheral edge surface 22 is shown in FIGS. 3 and 4, and corresponds to the distance between the two main faces 23, 24, taken along the peripheral edge surface 22. In the case where the peripheral edge surface 22 is perpendicular to the main faces 23, 24, it corresponds to the thickness of the final welded metal blank 16.

The main face 23 from which the solidification striations 28 extend corresponds to the face located on the same side of the final welded metal blank 16 as the cutting tool performing the cutting, for example the laser beam 15 in the example shown in the figures.

In the example shown in FIG. 4, the solidification striations 28 only extend over a fraction of the height h of the peripheral edge surface 22. In this example, the peripheral edge surface 22 comprises a zone 29 which does not comprise any solidification striations. The striation-free zone 29 extends over a fraction of the height h of the peripheral edge surface 22 from one main face 24 of the final welded metal blank 16, and more particularly from the main face 24 located on the side of the final welded metal blank 16 opposite to the side where the cutting tool performing the cutting is located.

According to an alternative, the solidification striations 28 may extend over the entire height h, from one main face 23 of the final welded blank 16 to the other 24.

Generally, the striations 28 become less accentuated with increasing distance from the main face 23, i.e. from the zone of impact of the cutting tool, in particular of the laser beam 15 in the case of laser cutting.

As can be seen in FIG. 4, the solidification striations 28 more particularly majoritarily tend to extend substantially perpendicular to the main face 23 of the final welded blank 16 in a first zone 25 of the peripheral edge surface 22, extending from the main face 23, while they tend to form an angle relative to the perpendicular to the main face 23 in a second zone 26, adjacent to the first zone 25. In FIG. 4, the arrow marked D shows the direction of relative movement of the cutting tool, in particular the laser beam 15, relative to the final welded blank 16 during cutting in a case where the cutting tool is displaced during the cutting step, while the initial welded metal blank 9 remains fixed in position.

As shown in FIGS. 3 and 4, cutting involving metal melting, and in particular laser cutting, additionally creates a Heat Affected Zone (HAZ) 30 at the periphery of the final welded metal blank 16.

The HAZ extends over the entire contour $C_1$, $C_2$, . . . of the final welded metal blank 16. More particularly, the HAZ extends over a width W from the edge of the welded metal blank 16 over the entire thickness of the final welded metal blank 16. In the case of laser cutting, the HAZ more particularly extends over a width W greater than or equal to 0.1 mm, and preferably smaller than or equal to 3 mm, from the edge of the welded metal blank 16.

The HAZ results from the heating of the peripheral edge surface 22 during cutting involving metal melting.

The HAZ may be observed through conventional means for detecting the presence of a Heat Affected Zone, for example through micro- or nano-hardness measurements or through metallographic observations after adapted etching.

The structure of the HAZ is different from that of the rest of the final welded metal blank 16, and in particular from the structure of the first and second metal blank portions 17, 18. This modified structure in the HAZ results from the heating of the cut edge during the cutting process.

In particular, in the HAZ, the microstructure of the substrate is different from the microstructure of the substrate 5 in the remainder of the first or second metal blank portion 17, 18. In particular, the austenitic grain size is strictly greater in the HAZ than in the remainder of the first or second metal blank portion 17, 18.

Furthermore, due to the heating of the precoating 6 at the cut edge during cutting, the HAZ comprises a coating having a structure that is different from the structure of the precoating 6 on the remainder of the first and second metal blank portions 17, 18. In particular, the coating in the HAZ no longer comprises an intermetallic alloy layer 7 and a metallic alloy layer 8, as is the case for the precoating 6.

According to one particular embodiment, the cutting of the initial welded metal blank 9 for obtaining the final welded metal blank(s) 16 is performed using laser cutting and, during the cutting step, laser cutting is carried out in such a way that the following two features are present on the peripheral edge surface 22 of the final welded metal blank 16:

(a) the total surface fraction $S_{Total}$ of aluminum on a substrate region of the peripheral edge surface 22 directly resulting from the laser cutting operation is greater than or equal to 9%; and (b) the surface fraction $S_{Bottom}$ of aluminum in the bottom half of the substrate region of the peripheral edge surface 22 directly resulting from the laser cutting operation is greater than or equal to 0.5%.

In this context, "directly resulting" in particular means that the fraction or ratio of aluminum is measured immediately after the laser beam of the laser cutting device has cut the final welded metal blank 16 from the initial welded metal blank 9, and in particular before any further step is carried out on the peripheral edge surface 22, for example before a possible finishing step of the peripheral edge surface 22, such as brushing, machining, milling, sandblasting or stripping.

In this context, the substrate region of the peripheral edge surface 22 corresponds to the surface of the substrate 5 located at the peripheral edge surface 22. It consists essentially of the material of the substrate 5.

The total surface fraction $S_{Total}$ of aluminum on the substrate region of the peripheral edge surface 22 may be determined as follows:

the substrate region of the peripheral edge surface 22 is imaged using scanning electron microscopy;

the information obtained from the scanning electron microscopy is processed to obtain an EDS (Energy Dispersive X-Ray Spectroscopy) image showing, among all alloying elements, only the aluminum present on the considered substrate region. For example, the image is treated in such a manner that the aluminum traces present on the considered substrate region appear in a color, such as red, strongly contrasting with a black background. As a result of the laser displacement during cutting, aluminum appears as inclined dripping traces.

the thus obtained EDS image is then processed through image processing in order to determine the surface fraction of aluminum in the image.

For this purpose, the number N of pixels corresponding to aluminum in the EDS image of the considered substrate region is measured using image processing.

For example, this image processing may be performed through a conventional image treatment analysis software known per se, such as for example the Gimp image analysis software.

The total surface fraction $S_{Total}$ of aluminum in the substrate region of the peripheral edge surface 22 is then obtained by dividing the number N of thus measured aluminum pixels by the total number of pixels in the image of the considered substrate region.

The same method is used for determining the surface fraction $S_{Bottom}$ of aluminum in the bottom half of the substrate region of the peripheral edge surface 22, but based on the analysis of an image of the bottom half of the substrate region of the peripheral edge surface 22.

The at least partial aluminum coverage of the peripheral edge surface 22 results from the melting of the precoating 6 at the peripheral edge of the final welded blank 16 during laser cutting, a portion of the melted precoating 6 flowing onto the peripheral edge surface 22.

In this embodiment, the laser cutting parameters, and in particular the laser cutting linear energy and the pressure of the assist gas used for the laser cutting step are chosen in such a manner that the above-mentioned features (a) and (b) are obtained.

In this context, the laser cutting linear energy corresponds to the amount of energy sent by the laser beam during laser cutting per unit length. It is calculated by dividing the power of the laser beam by the cutting speed.

This embodiment is particularly advantageous, since the coverage of the peripheral edge surface 22 according to features (a) and (b) results in a good protection of the peripheral edge surface 22 from corrosion or oxidation during storage and/or subsequent heat treatments, for example during hot forming.

Figure 5:
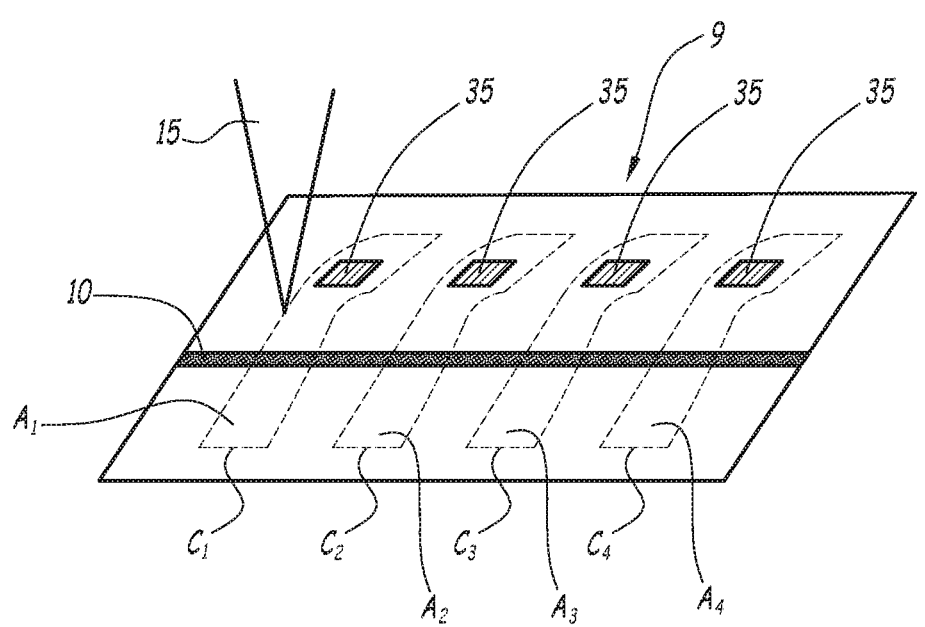
FIG. 5 is a schematic view of an additional optional step of the method for producing a welded metal blank.

As shown in FIG. 5, the method for producing the welded metal blank 16 may optionally comprise a step of welding at least one patch 35 onto the initial welded metal blank 9.

In particular, each patch 35 consists of a flat piece of metal having an area strictly smaller than the area of the initial welded metal blank 9, and more particularly strictly smaller than the area of the final welded metal blank 16.

As shown in FIG. 5, the patch 35 is in surface contact with the initial welded blank 9 over the entire patch surface. It is for example welded thereto through resistance spot welding, laser remote welding, electron beam welding or friction stir welding. Generally, resistance spot welding or laser remote welding are preferred. Among these, resistance spot welding is the preferred welding method.

The patch 35 preferably extends over only one of the first and second initial metal sheets 1, 3 in the initial welded metal blank 9.

According to an alternative, the patch 35 may extend across the weld joint 10. In this case, it extends on each of the initial metal sheets 1,3 extending on either side of the initial welded metal blank 9.

The patch 35 is intended for reinforcing the part formed from the final welded blank 16 in areas which will be subjected to particularly high solicitations in use. The material and thickness of the patch 35 is chosen so as to optimize the reinforcement of the part depending on the needs. According to one example, the patch 35 is made of steel. It is for example made of the same material as one of the initial metal sheets 1, 3 onto which it is welded.

Preferably, if several final welded blanks 16 are cut one from a same initial welded blank 9, the patch welding step comprises welding as many patches 35 to the initial welded blank 9 as there as final welded blanks 16 intended to be cut out therefrom. Preferably, the location of the patches 35 on the initial welded blank 9 is chosen in such a manner that all the patches 35 will be located in the same location in the respective final welded metal blank 16.

Figure 6:
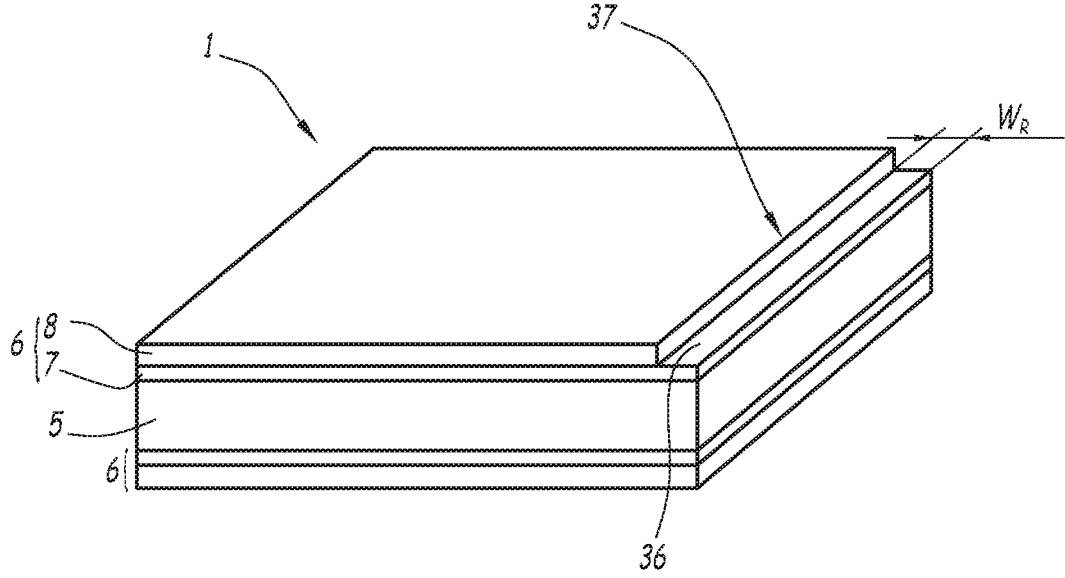
FIG. 6 is a schematic view of an initial metal sheet comprising a removal zone.

The method for producing the initial welded metal blank 9 may further optionally comprise, prior to welding, a step of removing the precoating 6 over at least a fraction of its thickness over a removal zone 36 at a weld edge 37 of the first and/or second initial steel sheets 1, 3. The weld edge 37 refers to the edge of the first and/or second initial steel sheets 1, 3 which is intended to be at least partially incorporated into the weld joint 10. An example of an initial metal sheet 1 comprising such a removal zone 36 is shown in FIG. 6.

The width WR of the removal zone 36 on each of the steel sheets 1, 3 is for example comprised between 0.2 and 2.2 mm.

Preferably, the removal step is carried out so as to remove only the metallic alloy layer 8 while leaving the intermetallic alloy layer 7 in the removal zone 36 over at least a portion of its height. In this case, the residual intermetallic alloy layer 7 protects the areas of the initial welded metal blank 9 immediately adjacent to the weld joint 10 from oxidation and decarburization during subsequent hot-forming steps, and from corrosion during the in-use service.

The removal is preferably carried out using a laser beam, and in particular a pulsed laser beam.

The present disclosure further relates to an installation 38 for carrying out the method for producing a welded metal blank 16 as described above. An example of such an installation is shown schematically in FIG. 7. This installation comprises:

a first cutting station 40, configured for cutting at least a first initial metal sheet 1 from a first metal strip 2 and a second initial metal sheet 3 from a second metal strip 4;

a welding station 42, configured for joining at least the first and the second initial metal sheet 1,3 by welding so as to obtain an initial welded metal blank 9 having an initial contour $C_0$, the initial welded metal blank 9 comprising a weld joint 10 joining the first and the second initial metal sheets 1,3; and a second cutting station 44, configured for cutting said initial welded metal blank 9 using a cutting process involving metal melting so as to obtain at least one final welded metal blank 16 having a final contour $C_1, C_2, \ldots$, the final welded metal blank 16 comprising a first metal blank portion 17 and a second metal blank portion 18 joined by a weld joint 19 consisting of a portion of the weld joint 10 obtained during the joining step.

The first cutting station 40 comprises a cutting tool configured for performing the cutting operation. It is for example a laser cutting station, comprising at least one laser tool comprising a laser head configured for emitting a laser beam. According to one embodiment, the first cutting station 40 comprises as many laser heads as there are strips to be cut, such that the different initial metal sheets may be obtained in parallel.

Advantageously, the first cutting station 40 is a mechanical cutting station. In particular, the mechanical cutting station comprises at least one shearing tool, and preferably as many shearing tools as there are strips to be cut, such that the different initial metal sheets may be obtained in parallel.

The welding station 42 is configured for performing laser welding, electron beam welding, arc welding, friction stir welding or resistance welding.

The second cutting station 44 comprises a cutting tool configured for performing the cutting operation involving metal melting. It is in particular a laser cutting station, comprising at least one laser tool comprising a laser head configured for emitting a laser beam. Alternatively, depending on the type of cutting process carried out by the cutting station 44, the second cutting station 44 may comprise a plasma torch or a heat source and associated oxidizing gas source.

According to one embodiment, the welding station 42 is a laser welding station and the second cutting station 44 is a laser cutting station, and the installation 38 comprises a combined weld and cutting head, configured for performing the welding and the laser cutting.

According to an alternative, the welding station 42 is a laser welding station, and the second cutting station 44 is a laser cutting station, and the welding station 42 and the second cutting station 44 are distinct from one another, and in particular each comprise a dedicated laser head.

The installation 38 further optionally comprises a pre-coating removal station configured for removing the precoating 6 over at least a fraction of its thickness over a removal zone at a weld edge of the first and/or second initial steel sheets 1, 3. This optional removal station is located upstream of the welding station 42 and downstream of the first cutting station 40. The precoating removal station advantageously comprises a laser tool, comprising a laser head configured for emitting a laser beam for removing the precoating, and more particularly a pulsed laser beam.

The present disclosure further relates to a method for producing a press-formed welded metal part, comprising the steps of:

producing a final welded metal blank 16 using the method as described above;

press-forming said final welded metal blank 16 into a three-dimensional shape so as to obtain a press-formed welded metal part (not shown), and optionally trimming the edges of said welded metal part using 3D laser cutting so as to obtain a final metal part, wherein the 3D laser cutting removes material from the welded metal part over a width smaller than or equal to 10 mm, and for example smaller than equal to 7 mm, and even more particularly smaller than or equal to 5 mm.

The final trimming step is optional. Therefore, it may or may not be carried out.

According to some embodiments, the dimensions of the press-formed welded metal part immediately after press-forming, and in the absence of any subsequent trimming step, correspond to the final desired dimensions for the part. In this case, no trimming is carried out.

According to an alternative, a trimming step is carried out on the press-formed welded metal part, this final trimming step removing material from the periphery of the welded metal part over a width smaller than or equal to 10 mm, and for example smaller than or equal to 7 mm, and more particularly smaller than or equal to 5 mm. The trimming is carried out using 3D laser cutting. Such a cutting technique is adapted for trimming the edges of the three-dimensional metal part obtained at the end of the press-forming step.

The thus obtained press-formed welded metal part has a three-dimensional shape and comprises a first metal part portion and a second metal part portion joined by a weld joint.

The first and second metal part portions respectively result from the press-forming of the first and second metal blank portions 17, 18. They each comprise a steel substrate having respectively substantially the same composition as the first and second initial steel sheets 1, 3 over at least a fraction of its thickness, and in particular at least 95% of its thickness. In this embodiment, the first and second metal part portions further comprise a coating. This coating results from the press-forming of the precoating 6 of the first and second initial metal sheets 1, 3.

The press-formed welded metal part preferably has a non-developable surface, which means that the surface of the part cannot be flattened onto a plane without distortion.

Prior to the possible trimming step, the press-formed welded metal part comprises a peripheral edge surface extending over the entire contour of the welded metal part. The peripheral edge surface extends from one face of the part to an opposite face thereof.

The peripheral edge surface corresponds to the peripheral edge surface 22 of the final welded metal blank 16, possibly deformed during the press-forming step.

The peripheral edge surface of the press-formed metal part comprises solidification striations extending over the entire contour of the press-formed welded metal part and over at least a fraction of the height of the peripheral edge surface.

The solidification striations are analogous to those already described with respect to the final welded metal blank 16.

According to one embodiment, the press-forming step is a hot forming step carried out in a hot forming press.

More particularly, the hot forming step comprises:

heating the final welded metal blank 16 to a temperature greater than or equal to a full austenitization temperature of at least one of the substrates of the final welded metal blank 16, and preferably the substrate having the highest full austenitization temperature; followed by hot press-forming the thus heated final welded metal blank 16 in a press.

Preferably, the hot press-forming step is followed by a step of cooling the press-formed welded metal part so as to obtain a press-hardened hot formed welded metal part.

The cooling rate is preferably equal to or greater than the critical martensitic or bainitic cooling rate of at least one of the steel substrates of the final welded metal blank 16, and preferably the substrate having the highest critical martensitic or bainitic cooling rate.

The cooling step is preferably carried out in the hot press-forming press.

The press-hardened hot formed metal part may comprise an oxidation layer extending over the peripheral edge surface. Such an oxidation layer results from the heat treatment carried out in a furnace containing oxygen, before the hot press-forming. Furthermore, the substrates of the first and second metal part portions have a mainly bainitic and/or martensitic microstructure.

According to an alternative, the press-forming step is a cold forming step.

Typically, the substrates of the first and second metal part portions obtained by cold press-forming do not have an isotropic microstructure. The orientation of the grains varies across the first and second metal part portions, in particular depending on the stress to which a considered zone thereof has subjected during cold press-forming.

Furthermore, for a part obtained through cold-forming, the hardness of the weld joint is generally higher than the hardness of the substrates of the first and second metal part portions.

For example, the microstructure of the substrates of the first and second metal part portions comprises at most 40% of martensite.

The coating of the first and second metal part portions in particular has the same structure and composition as the coating of the first and second initial metal sheets 1, 3.

The press-formed welded metal part is for example a part for a motor vehicle, such as a pillar, for example an A-pillar, a B-pillar or a C-pillar, a reinforcement part, a part of a front or rear body structure, such as a front or rear rail or a door part, such as a door sill part.

Figure 7:
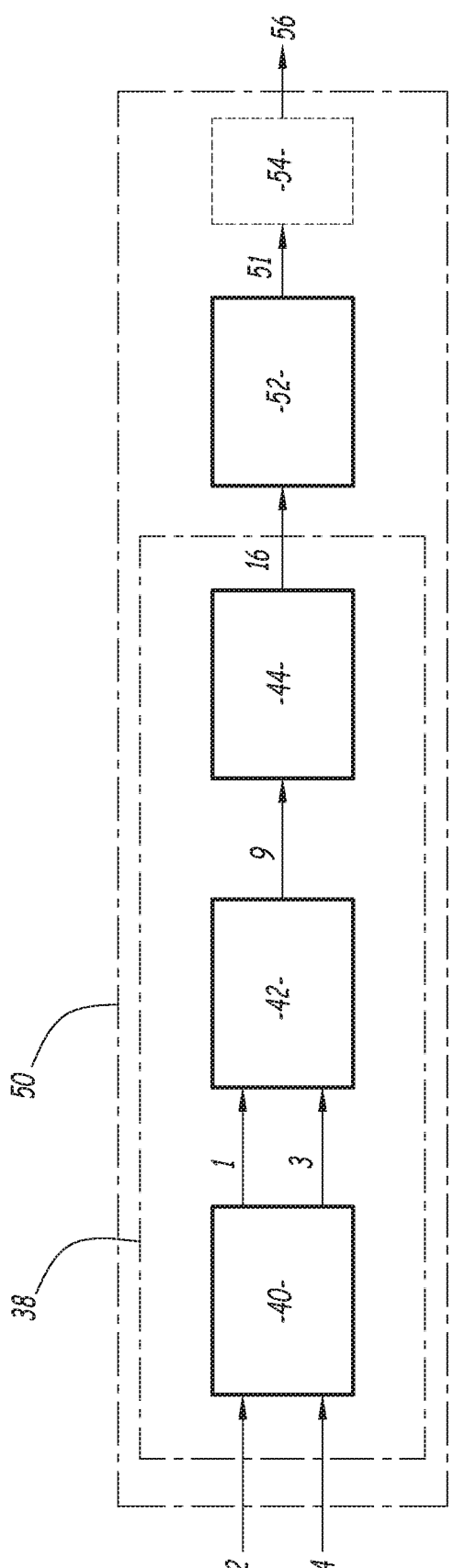
FIG. 7 is a schematic view of an installation for carrying out a method for producing a press-formed welded metal part according to the present disclosure.

The present disclosure also relates to an installation 50 for producing a press-formed welded metal part. Such an installation is schematically illustrated in FIG. 7. The installation 50 comprises:

the installation 38 for producing a final welded metal blank 16 as described above;

a press 52 configured for press-forming said final welded metal blank 16 into a three-dimensional shape so as to obtain the press-formed welded metal part 51, and optionally, a 3D laser cutting station 54, configured for trimming the edges of the press-formed welded metal part so as to obtain a final press-formed welded metal part 56.

The press 52 is for example a hot press-forming press. In this embodiment, the installation 38 further comprises a furnace adapted for heating the final welded metal blank 16 to a temperature greater than or equal to the full austenitization temperature of at least one of the substrates of the final welded metal blank 16, and preferably of the substrate having the highest full austenitization temperature. This furnace is located upstream of the hot press-forming step. Optionally, in the installation according to this embodiment, the hot press-forming press further comprises a cooling unit, configured for cooling the hot press-formed metal part so as to obtain a press-hardened press-formed welded metal part.

In the preceding description, the first and second metal strips 1, 3 have been described as comprising a steel substrate. However, according to a variant, the substrates of the first and second metal strips 1, 3 may consist of any other adapted metal, and for example of aluminum, aluminum alloy or aluminum-based alloy.

Furthermore, in the first embodiment, the first and second metal strips 1, 3 comprise a precoating 6 comprising an intermetallic alloy layer 7 and a metallic alloy layer 8, the metallic alloy layer 8 being a layer of aluminum, of aluminum alloy or of aluminum-based alloy. According to an alternative, the first and second metal strips 1, 3 may be uncoated or may comprise a coating that is different from that described with respect to the first embodiment, for example a zinc coating consisting of zinc, of a zinc-based alloy or of a zinc alloy, a coating containing magnesium or any other adapted coating composition.

According to an alternative to the first embodiment, the first and second metal strips 1, 3 may further comprise a steel substrate consisting of a steel adapted for cold forming, and more particularly for cold press-forming. According to this alternative, the first and second metal strips may be coated, for example with a coating or precoating as described above or uncoated.

In the first embodiment, the initial welded metal blank 9 has been more specifically described as comprising only two initial metal sheets 1, 3. According to alternatives, the initial welded metal blank 9 may comprise more than two initial metal sheets depending on the desired structure of the final welded metal blank 16 and of the final press-formed welded metal part. For example, the initial welded metal blank may comprise between three and five initial metal sheets. Depending on the needs, some of the initial metal sheets may have the same composition, thickness and/or mechanical properties. Further depending on the needs, some of the initial metal sheets may originate from the same metal strip or all of the metal sheets may originate from different metal strips.

In the case where N initial metal sheets are used, N being strictly greater than two, the initial metal sheets have the features already disclosed previously with respect to the initial metal sheets 1, 3.

In this case, the joining step comprises joining the initial metal sheets through welding, whereby more than one weld joint 10, and in particular N−1 weld joints 10 are obtained. Preferably, all the weld joints 10 have the properties mentioned above. Furthermore, the weld joints 10 are preferably parallel to one another. In this case, the final welded metal blank 16 comprises N metal blank portions, each metal blank portion resulting from a respective initial metal sheet and having the properties thereof.

According to a further alternative, the final welded metal blank 16 is uncoated and is subjected to a coating operation prior to the press-forming step. For example, the coating operation is a hot dip coating operation. Such an alternative results in an improved corrosion resistance of the final welded blank and press-formed welded part obtained therefrom.

The method according to the present disclosure is particularly advantageous.

Indeed, the two-step cutting method with the welding step in-between makes it possible to cut very simple shapes from the metal strips in the first cutting step. Therefore, this first cutting step can be carried out in a cost-effective manner, for example using a shearing tool. In particular, the method according to the present disclosure avoids the use of expensive blanking dies which have to be specifically tailored to one type of part.

The method according to the present disclosure is further very flexible, since the same tools may be used for producing a large variety of parts. In particular, the initial cutting step may be carried out using a conventional shearing tool, while the cutting step after welding is carried out using cutting processes which merely require a reprogramming of the cutting tool to the desired final contour. This flexibility is advantageous, since it makes it easy to change the design of the parts if desired. Such a flexibility is particularly advantageous in view of the tendency in the motor vehicle industry to produce more and more derivatives and different motor vehicle models with smaller volumes, as it allows reducing the investment costs.

The provision of a second cutting step using laser cutting after welding further makes it possible to minimize the scrap and therefore the production costs. Indeed, in the method according to the present disclosure, the distance between adjacent final welded metal blanks in a given initial welded metal blank may be as small as about 2 to 3 mm. On the contrary, in the case of mechanical die blanking prior to welding without additional laser cutting step after welding, a distance of at least 5 mm generally has to be provided between the blank portions and the strip edge and at least 8 to 10 mm between adjacent blank portions, thus resulting in a relatively high amount of scrap.

The fact that the contours of the final welded metal blanks are cut out through laser cutting after the welding step rather than before, further makes it possible to greatly decrease the tolerances on the dimensions of the blanks at the time of press-forming. As a consequence, there is no or almost no excess material to be removed at the periphery of the press-formed welded metal part. In particular, compared to a method in which the final welded blank portions are cut directly from the initial metal strips using blanking dies prior to welding without an additional laser cutting step after welding, the use of the method according to the present disclosure allows reducing the tolerances on the dimensions of the final welded metal blanks from ±2 mm to ±0.2 mm. Due to these tight tolerances, the relatively expensive 3D laser cutting step on the press-formed welded part can be avoided or at least minimized.

Furthermore, thanks to the use of an additional laser cutting step after welding and before press-forming, the geometrical variations between the thus produced final welded blanks, if any, are very limited as compared to a method in which the final welded blank obtained through welding is press-formed directly. These limited geometrical variations improve the repeatability of the positioning of the final welded blanks in the press-forming tool and, consequently, the repeatability of the press-forming operation as a whole.

The method according to the present disclosure further makes it possible to provide welded metal blanks 16 for press-forming having relatively short weld joints 19, and in particular weld joints 19 with a length smaller than or equal to 250 mm, and even smaller than or equal to 150 mm, and thus to produce press-formed parts with such short weld joints. This possibility further increases the flexibility of the method as regards the variety of parts that may be produced therewith.

The method according to the present disclosure further results in an improved quality of the press-formed welded part.

In particular, due to the presence of the cutting step after the welding operation, weld start and stop defects or craters can be avoided in the final welded metal blanks 16 and therefore in the press-formed welded part obtained therefrom. Indeed, even though these defects may be present in the initial welded metal blank, they may be removed during the cutting operation for producing the final welded metal blanks therefrom. Avoiding such defects in the final welded blank is advantageous, since this kind of local defect may otherwise result in a more important defect when subjected to high stress during the press-forming process, which can potentially propagate this local defect into a fracture, rendering the press-formed welded part unusable due to safety concerns. Weld start and stop defect or craters are defect which are created at the start and at the end (or stop) of the welding process. Such defects or craters are well known to the skilled person. In the case of laser welding, these defects result from capillary effects.

The method according to the present disclosure further allows adjusting the position of the final welded metal blank 16 within the initial welded metal blank 9, and in particular relative to the weld joint 10 thereof, depending on the needs, and even in the course of the implementation of the method for producing the final welded metal blank or the press-hardened welded metal part.

Such an adjustment possibility reduces the amount of scrap, since it makes it possible to avoid including defects that may have been detected in the weld joint 10 in the final welded metal blank 16. On the contrary, in the absence of a cutting step after welding and prior to press-forming, the whole welded metal blank would have to be discarded in the event of a defect within the weld joint between the metal blank portions.

Such an adjustment possibility also makes it possible to adjust the relative position of the weld joint 19 within the final welded metal blank 16, and therefore also indirectly in the press-formed welded metal part, for example in the case press-forming issues are observed, thus contributing to improving the quality of the final part and reducing the cost. In particular, in the absence of a cutting step after welding and prior to press-forming, it would, in this case, be necessary to conceive new blanking dies for producing the final blank portions, which would result in high added costs.

What is claimed is:

1. A method for producing a welded metal blank comprising the steps of:

cutting at least a first initial metal sheet from a first metal strip and a second initial metal sheet from a second metal strip;

joining at least the first initial metal sheet and the second initial metal sheet by welding so as to obtain an initial welded metal blank having an initial contour, the initial welded metal blank comprising a weld joint joining the first and the second initial metal sheets; and cutting the initial welded metal blank by a process involving metal melting so as to obtain at least one final welded metal blank having a final contour, the at least one final welded metal blank comprising a first metal blank portion and a second metal blank portion joined by a weld joint portion consisting of a portion of the weld joint obtained during the joining step, wherein the first initial metal sheet and the second initial metal sheet comprise a steel substrate, wherein at least one of the first initial metal sheet and the second initial metal sheet comprises, on at least one main face of the substrate, a precoating comprising an intermetallic alloy layer and a metallic alloy layer extending atop the intermetallic alloy layer, the metallic alloy layer being a layer of aluminum, a layer of aluminum alloy or a layer of aluminum-based alloy, wherein the at least one final welded metal blank has a thickness comprised between 0.8 mm and 5 mm and comprises a peripheral edge surface resulting from the cutting of the initial welded metal blank, the peripheral edge surface extending from one main face of the at least one final welded metal blank to the other, and wherein the cutting step carried out on the initial welded metal blank is a laser cutting step, the laser cutting being carried out in such a way that it results directly in a surface fraction of aluminum on a substrate region of the peripheral edge surface directly resulting from the laser cutting operation greater than or equal to 9% and a surface fraction of aluminum on the bottom half of the substrate region of the peripheral edge surface directly resulting from the laser cutting operation is greater than or equal to 0.5%.

2. The method according to claim 1, wherein at least one of the first initial metal sheet and the second initial metal sheet has a quadrilateral-shaped contour.

3. The method according to claim 1, wherein the joining step is a laser welding, an electron beam welding, an arc welding, a friction stir welding or a resistance welding step.

4. The method according to claim 1, wherein the weld joint obtained during the joining step has a length greater than or equal to 300 mm.

5. The method according to claim 1, wherein the final contour of the at least one final welded metal blank includes at least one non-linear portion.

6. The method according to claim 1, wherein each final welded metal blank has a final contour delimiting a respective area, and the sum of the areas delimited by the final contours of all the final welded metal blanks cut from a considered initial welded metal blank is strictly smaller than the area delimited by the initial contour of the respective initial welded metal blank.

7. The method according to claim 1, wherein, for the at least one final welded metal blank, the weld joint portion has a length smaller than or equal to 250 mm.

8. The method according to claim 1, wherein the first metal strip and the second metal strip have different properties.

9. The method according to claim 1, further comprising, for at least one among the first initial metal sheet and the second initial metal sheet, a step of removing the precoating over at least a fraction of its thickness at a weld edge on at least one face of at least one of the first initial metal sheet and second initial metal sheet prior to joining the first initial metal sheet and second initial metal sheet through welding.

10. The method according to claim 1, wherein the welding is performed using a filler material.

11. The method according to claim 1, wherein the cutting step on the initial welded metal blank is performed so as to obtain the final welded blank which does not include any weld start or stop craters or defects.

12. A method for producing a press-formed welded metal part comprising the steps of:
    producing the at least one final welded metal blank using the method according to claim 1; and
    press-forming the at least one final welded metal blank into a three-dimensional shape so as to obtain a press-formed welded metal part.

13. The method as recited in claim 12, further comprising trimming edges of the press-formed welded metal part using 3D laser cutting so as to obtain a final press-formed welded metal part, the 3D laser cutting removing material from the press-formed welded metal part over a width smaller than or equal to 10 mm.

14. The method as recited in claim 12, wherein the press-forming step is a hot forming step carried out in a hot forming press.

15. The method as recited in claim 14, wherein the first metal blank portion and second metal blank portion of the final welded metal blank comprise a steel substrate, and wherein the method further comprises a step of cooling the press-formed welded metal part so as to obtain a press-hardened press-formed welded metal part.

16. The method as recited in claim 15, wherein a cooling rate of the step of cooling is equal to or greater than the critical martensitic or bainitic cooling rate of at least one of the substrates of the final welded metal blank.

17. The method as recited in claim 12, wherein the press-forming step is a cold forming step.

18. The method as recited in claim 1,
    wherein, during the cutting step carried out on the initial welded metal blank, at least two final welded metal blanks are cut from the initial welded metal blank, and the at least two final welded blanks cut from one initial welded blank have differently shaped contours.

19. The method according to claim 1, wherein, during the cutting step carried out on the initial welded metal blank, at least two final welded metal blanks are cut from the initial welded metal blank, and
    wherein a ratio between the length of the weld joint portion and a dimension of the at least one final welded metal blank taken perpendicular to the weld joint portion is smaller than or equal to 0.7.

20. A welded metal blank comprising a first metal blank portion and a second metal blank portion joined by a weld joint, the welded metal blank comprising a peripheral edge surface extending from one main face of the welded metal blank to the other over the entire contour of the welded metal blank, the peripheral edge surface comprising solidification striations extending over the entire contour of the welded metal blank and over at least a fraction of the height of the peripheral edge surface,
    wherein each of the first and second metal blank portions comprises a steel substrate carrying, on at least one of its faces, a precoating including an intermetallic alloy layer and a metallic alloy layer extending atop the intermetallic alloy layer, the metallic alloy layer being a layer of aluminum, a layer of aluminum alloy or a layer of aluminum-based alloy,
    wherein a thickness of the welded metal blank is comprised between 0.8 mm and 5 mm and the surface fraction of aluminum on a substrate region of the peripheral edge surface is greater than or equal to 9% and the surface fraction of aluminum on the bottom half of the substrate region of the peripheral edge surface is greater than or equal to 0.5%.

* * * * *